United States Patent
Shibamoto

(10) Patent No.: US 11,860,136 B2
(45) Date of Patent: Jan. 2, 2024

(54) GAS CHROMATOGRAPHY ANALYSIS METHOD AND GAS CHROMATOGRAPHY ANALYSIS SYSTEM

(71) Applicant: SHIMADZU CORPORATION, Kyoto (JP)

(72) Inventor: Shigeaki Shibamoto, Kyoto (JP)

(73) Assignee: SHIMADZU CORPORATION, Kyoto (JP)

(*) Notice: Subject to any disclaimer, the term of this patent is extended or adjusted under 35 U.S.C. 154(b) by 229 days.

(21) Appl. No.: 17/332,382

(22) Filed: May 27, 2021

(65) Prior Publication Data
US 2021/0389281 A1    Dec. 16, 2021

(30) Foreign Application Priority Data
Jun. 12, 2020  (JP) .................. 2020-102011

(51) Int. Cl.
*G01N 30/14*    (2006.01)
*C25B 1/04*    (2021.01)
*G01N 30/02*    (2006.01)

(52) U.S. Cl.
CPC ......... *G01N 30/14* (2013.01); *C25B 1/04* (2013.01); *G01N 2030/025* (2013.01)

(58) Field of Classification Search
CPC .................................. G01N 2030/025
See application file for complete search history.

(56) References Cited

U.S. PATENT DOCUMENTS

| 2002/0054832 A1 | 5/2002 | Amirav et al. |
| 2007/0125233 A1* | 6/2007 | Bostrom ........... G01N 30/32 96/101 |
| 2013/0025347 A1 | 1/2013 | Rhodes et al. |
| 2017/0038347 A1* | 2/2017 | Tipler ............... C25B 9/19 |

OTHER PUBLICATIONS

Office Action dated Aug. 8, 2023 in Chinese Application No. 202110493444.3.

* cited by examiner

*Primary Examiner* — Jamel E Williams
*Assistant Examiner* — Alex T Devito
(74) *Attorney, Agent, or Firm* — Sughrue Mion, PLLC

(57) ABSTRACT

A gas chromatography analysis method includes separating a component in sample gas by introducing the sample gas into a separation column (4) using carrier gas, and detecting a component in sample gas that has passed through the separation column (4) by introducing the sample gas into a detector (6). The detecting includes individually taking out hydrogen gas and oxygen gas generated by electrolysis of water, and controlling flow rates of taken-out hydrogen gas and oxygen gas and supplying the taken-out hydrogen gas and oxygen gas to the detector as detector gas.

7 Claims, 4 Drawing Sheets

GAS CHROMATOGRAPHY ANALYSIS METHOD AND GAS CHROMATOGRAPHY ANALYSIS SYSTEM

BACKGROUND OF THE INVENTION

1. Field of the Invention

The present invention relates to a gas chromatography analysis method and a gas chromatography analysis system.

2. Description of the Related Art

In gas chromatography analysis, a flame ionization detector (FID), a flame photometric detector (FPD), a flame thermionic detector (FTD), a thermal conductivity detector (TCD), and the like can be used as a detector.

In a detector such as an FID, it is necessary to supply hydrogen gas to the detector. A hydrogen gas cylinder is generally used as a source of hydrogen gas. However, in order to avoid the risk of the hydrogen gas cylinder, it has been proposed to generate hydrogen gas by a water electrolyzer, and use the generated hydrogen gas as working gas of an FID (see US2002/054832A1).

SUMMARY OF THE INVENTION

As to the conventional system described in US2002/054832A1, there is a room for improvement in efficiency of use of hydrogen gas and oxygen gas generated by the water electrolyzer.

An object of the present invention is to efficiently utilize hydrogen gas and oxygen gas generated by electrolysis of water in gas chromatography analysis.

A gas chromatography analysis method according to the present invention includes separating components included in a sample gas by introducing the sample gas into a separation column using carrier gas, and detecting the components in the sample gas that has passed through the separation column and has been introduced into a detector. The detecting includes taking out hydrogen gas and oxygen gas generated by electrolysis of water in a separated manner, and supplying the taken-out hydrogen gas individually and oxygen gas to the detector as detector gas with each flow rate of taken-out hydrogen gas and oxygen gas being independently controlled.

A gas chromatography analysis system according to the present invention includes a separation column for separating components included in a sample gas, a detector fluidly connected to downstream of the separation column, and being for detecting components separated by the separation column, a gas generator configured to generate hydrogen gas and oxygen gas by electrolysis of water and to individually take out generated hydrogen gas and oxygen gas, a first flow path for guiding hydrogen gas, as detector gas, generated by the gas generator to the detector, a second flow path for guiding oxygen gas, as detector gas, generated by the gas generator to the detector, and a detector gas flow rate adjustor that adjusts each of a flow rate of hydrogen gas introduced into the detector through the first flow path and a flow rate of oxygen gas introduced into the detector through the second flow path.

That is, in the gas chromatography analysis method and system according to the present invention, hydrogen gas and oxygen gas generated by electrolysis of water are individually taken out, and are introduced into a detector as detector gas while flow rates of hydrogen gas and oxygen gas are controlled. In this manner, a ratio of hydrogen gas and oxygen gas introduced into the detector can be controlled to a desired value. An ideal ratio of hydrogen gas and oxygen gas introduced into the detector differs depending on the type of the detector. However, in the present invention, the ratio of hydrogen gas and oxygen gas introduced into the detector can be controlled to a desired value, and various detectors can be supported. In contrast, in the system of introducing mixed gas of hydrogen gas and oxygen gas generated by electrolysis of water into the detector as in US2002/054832A1, the ratio of hydrogen gas to oxygen gas introduced into the detector is constant, and various detectors cannot be supported.

In the gas chromatography analysis method according to the present invention, hydrogen gas and oxygen gas generated by electrolysis of water are individually taken out, and are supplied to a detector as detector gas while flow rates of the taken-out hydrogen gas and oxygen gas are controlled. Accordingly, hydrogen gas and oxygen gas generated by electrolysis of water can be efficiently utilized in gas chromatography analysis.

The gas chromatography analysis system according to the present invention is configured so that hydrogen gas and oxygen gas are generated by electrolysis of water and individually taken out, and are introduced into a detector as detector gas while flow rates of the taken-out hydrogen gas and oxygen gas are adjusted. Accordingly, hydrogen gas and oxygen gas generated by electrolysis of water can be efficiently utilized in gas chromatography analysis.

DETAILED DESCRIPTION OF THE INVENTION

Hereinafter, an embodiment of the gas chromatography analysis method and system according to the present invention will be described with reference to the drawings.

Figure 1:
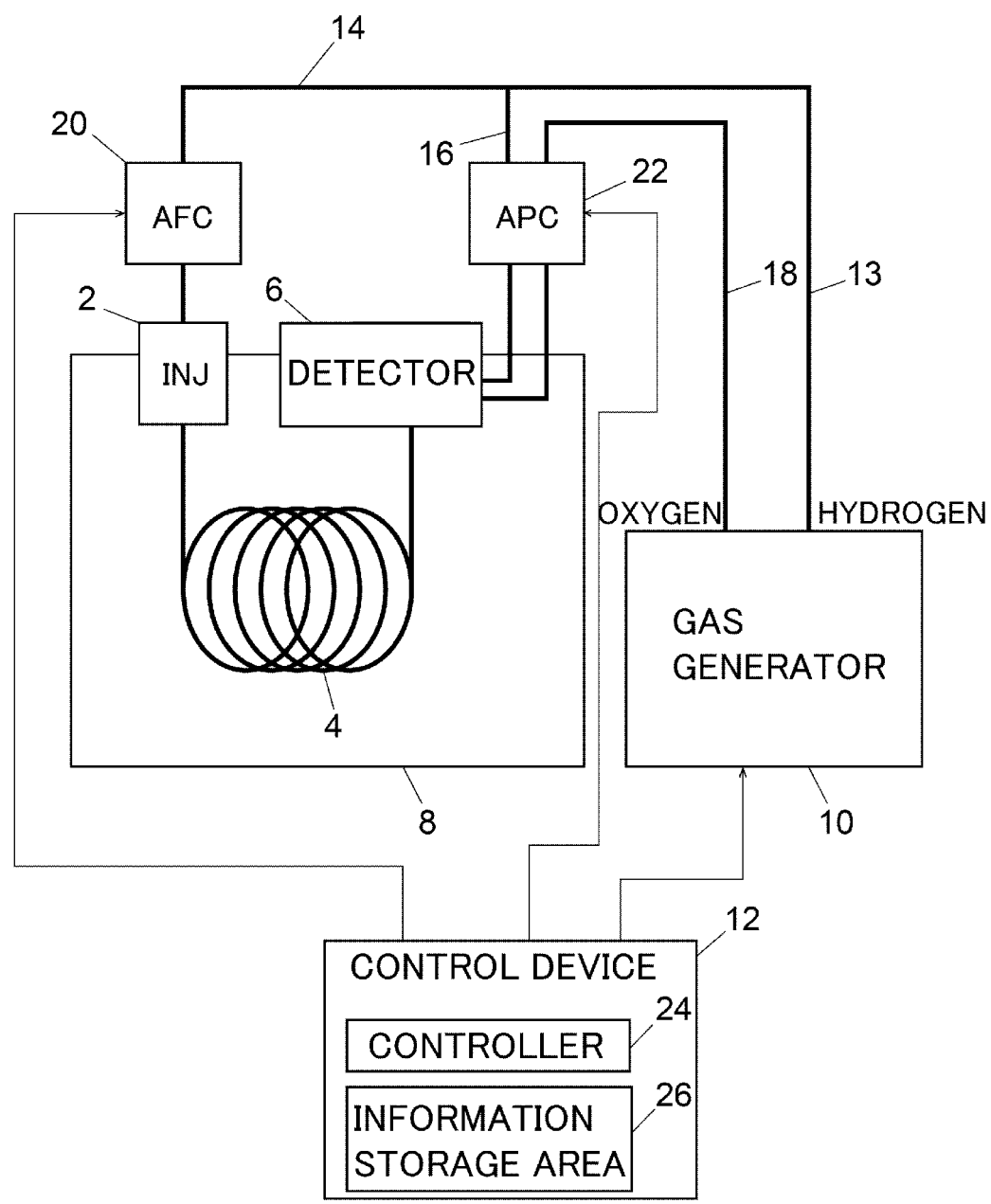
FIG. 1 is a schematic configuration diagram showing one embodiment of a gas chromatography analysis system.

As shown in FIG. 1, the gas chromatography analysis system of the present embodiment includes an injector 2, a separation column 4, a detector 6, a column oven 8, a gas generator 10, a control device 12, an advanced flow controller (AFC) 20, and an advanced pressure controller (APC).

The separation column 4 may be, for example, a capillary column coated or filled with a separation medium for separating components included in sample gas. The separation column 4 has an inlet end fluidly connected to the injector 2 and an outlet end fluidly connected to the detector 6. The separation column 4 is housed in the column oven 8 in which the temperature of the internal space is adjusted to a set temperature.

By the way, a packed column may be used as the separation column 4 instead of the capillary column. In particular, in a case where the detector 6 is a TCD, it is preferable that a packed column is used as the separation column 4.

The injector 2 is for generating sample gas and introducing the generated sample gas into the separation column 4 by carrier gas. In the present embodiment, hydrogen gas generated by the gas generator 10 is used as the carrier gas.

The detector 6 is for detecting components included in the sample gas that has passed through the separation column 4. As the detector 6, any one of an FID, an FPD, an FTD, and a TCD can be used. When the detector 6 is any of an FID, an FPD, and an FTD, hydrogen gas and oxygen gas generated by the gas generator 10 are supplied to the detector 6 as detector gas. Further, when the detector 6 is a TCD, only hydrogen gas generated by the gas generator 10 is supplied to the detector 6 as detector gas (that is, a flow rate of oxygen gas introduced into the detector 6 is adjusted to zero).

Figure 4:
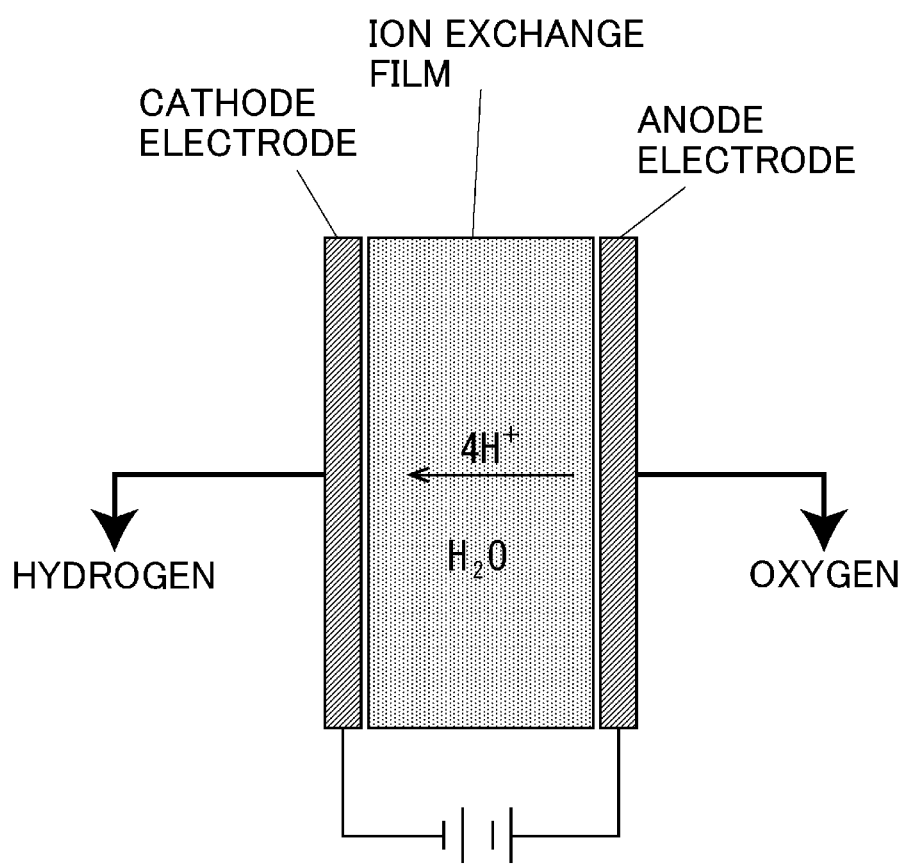
FIG. 4 is a principle diagram schematically showing a gas generation principle in a gas generator of the embodiment.

The gas generator 10 is configured to be able to generate hydrogen gas and oxygen gas by electrolysis of water, and to take out each of the generated hydrogen gas and oxygen gas in a separated manner. FIG. 4 schematically shows the gas generation principle in the gas generator 10. An anode electrode and a cathode electrode are provided in the gas generator 10 with an ion exchange film sandwiched between them. As DC voltage is applied between the anode electrode and the cathode electrode, oxygen is generated by the electrolysis reaction of the following formula on the anode electrode side:

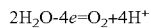

$$2H_2O - 4e = O_2 + 4H^+$$

and oxygen is generated by the electrolysis reaction of the following formula on the cathode electrode side:

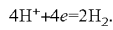

$$4H^+ + 4e = 2H_2.$$

The gas generator 10 is configured to be able to take out the oxygen gas generated at the anode electrode and the hydrogen gas generated at the cathode electrode individually. Note that an electrolysis device configured to be able to individually take out hydrogen gas and oxygen gas generated by electrolysis of water is known (for example, see JP-A-2020-066796, JP-A-2018-178231).

The gas generator 10 has a hydrogen gas outlet and an oxygen gas outlet, and a flow path 13 is connected to the hydrogen gas outlet and a flow path 18 is connected to the oxygen gas outlet. The flow path 13 is branched into a flow path 14 leading to the injector 2 and a flow path 16 leading to the detector 6. The flow path 18 leads to the detector 6. The flow path 16 constitutes a first flow path for guiding hydrogen gas generated by the gas generator 10 to the detector 6 as detector gas. The flow path 18 constitutes a second flow path for guiding oxygen gas generated by the gas generator 10 to the detector 6 as detector gas. The flow path 14 constitutes a third flow path for guiding hydrogen gas generated by the gas generator 10 to the upstream side of the separation column 4 as carrier gas.

The AFC 20 is for controlling each of a total flow rate of hydrogen gas introduced into the injector 2, inlet pressure of the separation column 4, a split vent flow rate, and a purge vent flow rate during analysis. A flow rate obtained by subtracting a split vent flow rate and a purge vent flow rate from a total flow rate of hydrogen gas introduced into the injector 2 is a flow rate of hydrogen gas introduced as carrier gas into the detector 6 via the separation column 4. That is, the AFC 20 realizes a carrier gas flow rate adjustor for adjusting a flow rate of hydrogen gas introduced into the detector 6 as carrier gas.

An APC 22 is for adjusting a flow rate of hydrogen gas flowing through the flow path 16 and a flow rate of oxygen gas flowing through the flow path 18. That is, the APC 22 realizes a detector gas flow rate adjustor for adjusting the flow rates of hydrogen gas and oxygen gas introduced into the detector 6 as detector gas. Note that the detector gas flow rate adjustor does not need to be realized by a flow controller such as one of the APC 22, and the flow rate of hydrogen gas flowing through the flow path 16 and the flow rate of oxygen gas flowing through the flow path 18 may be adjusted by flow controllers different from each other.

Here, a structure of the detector 6 will be described by taking an FID as an example.

Figure 2:
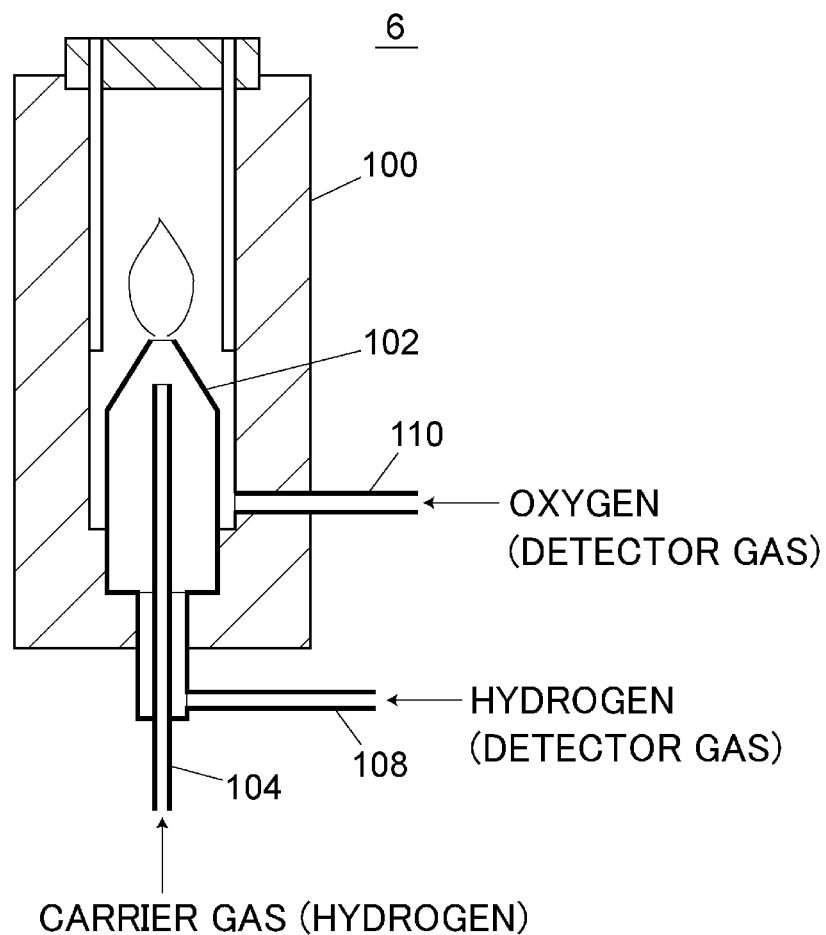
FIG. 2 is a cross-sectional view schematically showing an example of a structure of a detector of the embodiment.

In a case where the detector 6 is an FID, as shown in FIG. 2, a nozzle 102 for generating a hydrogen flame is provided in the internal space of a cell 100 of the detector 6. A pipe 104 forming an outlet portion of the separation column 4 passes through the inside of the nozzle 102. A pipe 108 forming a part of the flow path 16 is fluidly connected to the nozzle 102, and hydrogen gas generated by the gas generator 10 is introduced between an outer peripheral surface of the pipe 104 and an inner surface of the nozzle 102 as detector gas. The hydrogen gas introduced into the nozzle 102 as detector gas merges with carrier gas from the separation column 4 in a tip portion of the nozzle 102 and is ejected from the tip of the nozzle 102.

A pipe 110 forming a part of the flow path 18 passes through the internal space of the cell 100, and oxygen gas generated by the gas generator 10 is introduced into the internal space of the cell 100 as detector gas. The oxygen gas introduced into the internal space of the cell 100 is used as supporting gas for burning the hydrogen gas ejected from the tip of the nozzle 102, so that a hydrogen flame is formed at the tip of the nozzle 102. Note that the pipe 110 may communicate with the inside of the nozzle 2 so that the hydrogen gas and the oxygen gas are mixed inside the nozzle 2.

Returning to FIG. 1, description of the analysis system is continued.

The control device 12 has a function of controlling operation of the gas generator 10, the AFC 20, and the APC 22, and is realized by an electronic circuit including at least a central processing unit (CPU) and a data storage device. The control device 12 includes a controller 24 and an information storage area 26. The controller 24 is a function realized by a CPU executing a program, and the information storage area 26 is a function realized by a part of a storage area of a data storage device.

The controller 24 is configured not only to operate the gas generator 10 so that a necessary amount of hydrogen gas and oxygen gas for analysis is obtained, but also to control operation of the AFC 20 and APC 22 so that a ratio of a flow rate of hydrogen gas introduced into the detector 6 and a flow rate of oxygen gas introduced into the detector 6 is made suitable for the detector 6.

The ratio of flow rates of hydrogen gas to oxygen gas required for normal operation of the detector 6 differs depending on the type of the detector 6 (FID, FPD, or the like). The information storage area 26 stores information as to the ratio of flow rates of hydrogen gas and oxygen gas suitable for various detectors. Note that, as another embodiment, the detector 6 itself may hold information as to the ratio of hydrogen gas and oxygen gas suitable for the detector 6.

Figure 3:
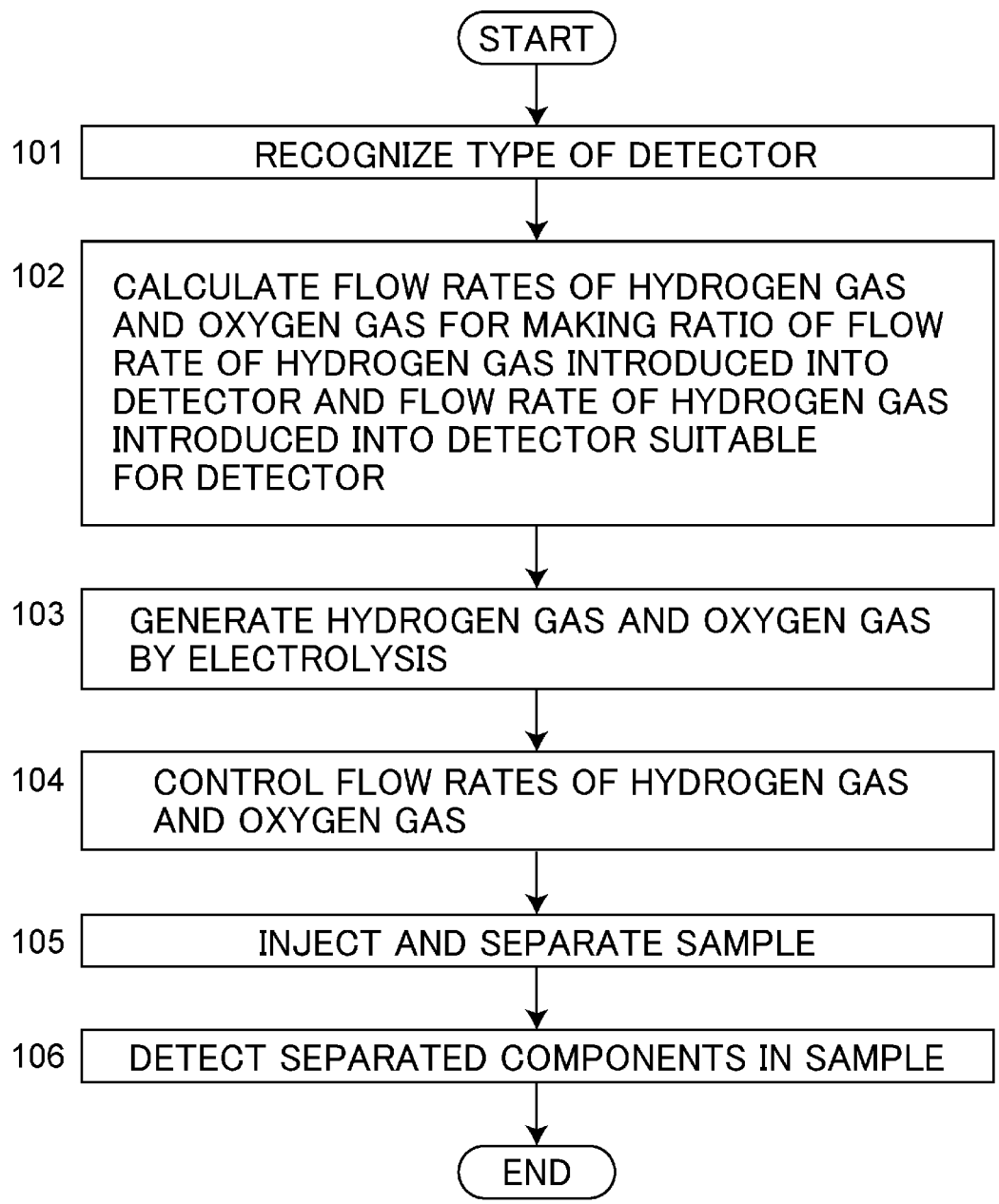
FIG. 3 is a flowchart showing an example of operation of the embodiment.

An example of operation of the gas chromatography analysis system realized by the controller 24 will be described with reference to FIG. 1 and the flowchart of FIG. 3.

First, the controller 24 recognizes of what type the detector 6 is based on information input by the user or based on information read from the detector 6, and obtains a ratio of flow rates of hydrogen gas and oxygen gas suitable for the type of the detector 6 based on the information stored in the information storage area 26 (Step 101). Then, the controller 24 calculates a flow rate of each of hydrogen gas and oxygen gas required to make a ratio of a total flow rate of hydrogen gas introduced into the detector 6 as carrier gas via the separation column 4 and hydrogen gas introduced into the detector 6 as detector gas via the flow path 16 and a flow rate of oxygen gas introduced into the detector 6 through the flow path 18 to the ratio obtained from the information of the information storage area 26 (Step 102). Based on a calculation result, the controller 24 operates the gas generator 10 so that a required amount of hydrogen gas and oxygen gas is generated (Step 103), and controls operation of the AFC 20 and the APC 22 so that a ratio of flow rates of hydrogen gas and oxygen gas introduced into the detector 6 becomes a ratio suitable for the detector 6 (Step 104).

In a state where flow rates of hydrogen gas and oxygen gas introduced into the detector 6 are controlled by the above operation, a sample is injected into the injector 2 and the gas chromatography analysis is started. The sample injected into the injector 2 becomes sample gas, which is introduced into the separation column 4 by carrier gas so that components included in the sample are separated from each other (Step 105). The components included in the sample separated by the separation column 4 are introduced into the detector 6 together with the carrier gas and detected (Step 106).

Note that, in the above embodiment, hydrogen gas generated by the gas generator 10 is used as the carrier gas. However, a carrier gas supply source may be provided separately from the gas generator 10. In that case, gas other than hydrogen gas such as helium gas and nitrogen gas can be used as the carrier gas. When gas other than hydrogen gas is used as the carrier gas, the controller 24 controls the APC 22 so that the ratio of a flow rate of hydrogen gas introduced into the detector 6 as detector gas and a flow rate of oxygen gas is suitable for the detector 6.

The embodiment described above is merely an example of embodiments of the gas chromatography analysis method and system according to the present invention. The embodiments of the gas chromatography analysis method and system according to the present invention are as described below.

An embodiment of the gas chromatography analysis method according to the present invention includes separating components included in a sample gas by introducing the sample gas into a separation column using carrier gas, and detecting the components in the sample gas that has passed through the separation column and has been introduce into a detector. The detecting includes taking out hydrogen gas and oxygen gas generated by electrolysis of water in a separated manner, and supplying the taken-out hydrogen gas and oxygen gas individually to the detector as detector gas with each flow rate of taken-out hydrogen gas and oxygen gas being independently controlled.

According to the specific aspect of the analysis method according to the above embodiment, the detecting includes adjusting a ratio of hydrogen gas and oxygen gas introduced into the detector to a suitable ratio for the detector. Such an embodiment makes it possible to use various types of detectors in gas chromatography analysis using hydrogen gas generated by electrolysis of water.

In the above specific aspect, the separating may include supplying hydrogen gas produced by electrolysis of water as the carrier gas to upstream of the separation column, and the detecting may include controlling a flow rate of each of hydrogen gas and oxygen gas so that a ratio of a total flow rate of hydrogen gas introduced into the detector as the detector gas and hydrogen gas introduced into the detector as the carrier gas and a flow rate of oxygen gas introduced into the detector becomes the suitable ratio for the detector. By such an embodiment, in a case where gas other than hydrogen gas and oxygen gas is not used as make-up gas, all gases used in the gas chromatography analysis are generated by electrolysis of water, and gas chromatography analysis not using a gas cylinder can be realized. Make-up gas can be eliminated by making the shape of the detector suitable for a flow rate during use of a capillary column and suppressing the spread of peaks in a chromatogram. Then, since the ratio of the total flow rate of hydrogen gas introduced into the detector and the flow rate of oxygen gas introduced into the detector is controlled to be suitable for the detector, various types of detectors can be used in the gas chromatography analysis not using a gas cylinder.

An embodiment of the gas chromatography analysis system according to the present invention includes a separation column for separating components included in a sample gas, a detector fluidly connected to downstream of the separation column, and being for detecting the components separated by the separation column, a gas generator configured to generate hydrogen gas and oxygen gas by electrolysis of water and to individually take out generated hydrogen gas and oxygen gas, a first flow path for guiding hydrogen gas, as detector gas, generated by the gas generator to the detector, a second flow path for guiding oxygen gas, as detector gas, generated by the gas generator to the detector, and a detector gas flow rate adjustor that adjusts each of a flow rate of hydrogen gas introduced into the detector through the first flow path and a flow rate of oxygen gas introduced into the detector through the second flow path.

A first aspect of the analysis system according to the above embodiment further includes a controller configured to adjust a ratio of a flow rate of hydrogen gas introduced into the detector and a flow rate of oxygen gas introduced into the detector to a suitable ratio for the detector by controlling the detector gas flow rate adjustor. By such an embodiment, various types of detectors can be used in the gas chromatography analysis system in which hydrogen gas and oxygen gas are generated by electrolysis of water and used as detector gas.

The first aspect may further include a third flow path for guiding hydrogen gas, as carrier gas, generated by the gas generator to an upstream side of the separation column, and a carrier gas flow rate adjustor that adjusts a flow rate of hydrogen gas introduced into the detector as the carrier gas, and the controller may be configured to adjust a ratio of a total flow rate of hydrogen gas introduced as the detector gas into the detector and hydrogen gas introduced as the carrier gas into the detector and a flow rate of oxygen gas introduced into the detector to a suitable ratio for the detector by controlling the detector gas flow rate adjustor and the carrier gas flow rate adjustor. By such an embodiment, in a case where gas other than hydrogen gas and oxygen gas is not used as make-up gas, all gases used in the analysis are generated by the gas generation unit, and a gas chromatography analysis system not using a gas cylinder can be realized. Make-up gas can be eliminated by making the shape of the detector suitable for a flow rate during use of a capillary column and suppressing the spread of peaks in a chromatogram. Then, since the ratio of the total flow rate of hydrogen gas introduced into the detector and the flow rate of oxygen gas introduced into the detector is controlled to be suitable for the detector, various types of detectors can be used in the gas chromatography analysis system not using a gas cylinder.

Further, in the first aspect, an information storage area that stores information as to a correlation between detector types and ratios of flow rates of hydrogen gas and oxygen gas suitable for each detector types may be included. In that case, the controller may be configured to recognize a type of the detector based on information input by the user or information obtained from the detector, to obtain a ratio of hydrogen gas and oxygen gas suitable for the type of the detector from the information storage area, and to use the obtained ratio of hydrogen gas and oxygen gas as the suitable ratio for the detector. In this manner, the analysis system automatically obtains a hydrogen gas flow rate and an oxygen gas flow rate suitable for the detector without the user setting the flow rates of hydrogen gas and oxygen gas.

The separation column in the present invention may be a capillary column.

DESCRIPTION OF REFERENCE SIGNS

2 Injector
4 Separation column
6 Detector
8 Column oven
10 Gas generator
12 Control device
13,14,16,18 Flow path
20 AFC
22 APC
24 Controller
26 Information storage area

What is claimed is:

1. A gas chromatography analysis method comprising:
separating components included in a sample gas by introducing the sample gas into a separation column using carrier gas; and
detecting the components in the sample gas that has passed through the separation column and has been introduced into a detector, wherein
the detecting includes
generating hydrogen gas and oxygen gas by electrolysis of water in a gas generator,
taking out generated hydrogen gas from a hydrogen gas outlet of the gas generator individually and generated oxygen gas from an oxygen gas outlet of the gas generator individually, and
supplying the taken-out hydrogen gas through a first flow path to the detector, without any chromatography columns therebetween, as detector gas and oxygen gas through a second flow path directly to the detector, without any chromatography columns therebetween, as detector gas with each flow rate of the taken-out hydrogen gas and oxygen gas being independently controlled.

2. The gas chromatography analysis method according to claim 1, wherein the detecting includes adjusting a ratio of hydrogen gas and oxygen gas introduced into the detector to a suitable ratio for the detector.

3. The gas chromatography analysis method according to claim 2, wherein
the separating includes supplying hydrogen gas produced by electrolysis of water as the carrier gas to upstream of the separation column, and the detecting includes controlling flow rates of each of hydrogen gas and oxygen gas so that a ratio of a total flow rate of hydrogen gas introduced into the detector as the detector gas, and hydrogen gas introduced into the detector as the carrier gas and a flow rate of oxygen gas introduced into the detector becomes the suitable ratio for the detector.

4. A gas chromatography analysis system comprising:
a separation column for separating components included in a sample gas;
a detector fluidly connected to downstream of the separation column, and being for detecting the components separated by the separation column;
a gas generator configured to generate hydrogen gas and oxygen gas by electrolysis of water and comprising a hydrogen gas outlet for taking out generated hydrogen gas individually and an oxygen gas outlet for taking out generated oxygen gas individually;
a first flow path for guiding hydrogen gas, as detector gas, taken out from the hydrogen gas outlet of the gas generator to the detector without any chromatography columns therebetween;
a second flow path for guiding oxygen gas, as detector gas, taken out from the oxygen gas outlet of the gas generator to the detector without any chromatography columns therebetween; and
a detector gas flow rate adjustor that adjusts each of a flow rate of hydrogen gas introduced into the detector through the first flow path and a flow rate of oxygen gas introduced into the detector through the second flow path.

5. The gas chromatography analysis system according to claim 4, further comprising a controller configured to adjust a ratio of a flow rate of hydrogen gas introduced into the detector and a flow rate of oxygen gas introduced into the detector to a suitable ratio for the detector by controlling the detector gas flow rate adjustor.

6. The gas chromatography analysis system according to claim 5, further comprising:
a third flow path for guiding hydrogen gas, as carrier gas, generated by the gas generator to upstream of the separation column; and
a carrier gas flow rate adjustor that adjusts a flow rate of hydrogen gas introduced into the detector as the carrier gas, wherein
the controller is configured to adjust a ratio of a total flow rate of hydrogen gas introduced as the detector gas into the detector, and hydrogen gas introduced as the carrier gas into the detector and a flow rate of oxygen gas introduced into the detector to a suitable ratio for the detector by controlling the detector gas flow rate adjustor and the carrier gas flow rate adjustor.

7. The gas chromatography analysis system according to claim 5, further comprising:
an information storage area that stores information as to a correlation between detector types and ratios of flow rates of hydrogen gas and oxygen gas suitable for each detector types, wherein
the controller is configured to recognize a type of the detector based on information input by a user or information obtained from the detector, to obtain a ratio of hydrogen gas and oxygen gas suitable for the type of the detector from the information storage area, and to use the obtained ratio of hydrogen gas and oxygen gas as the suitable ratio for the detector.

* * * * *